United States Patent
Lewin

(10) Patent No.: US 8,688,043 B2
(45) Date of Patent: Apr. 1, 2014

(54) MOBILE WIRELESS COMMUNICATIONS DEVICE INCLUDING NFC ANTENNA SCANNING SWITCH AND RELATED METHODS

(75) Inventor: Mathias Lewin, Helsingborg (SE)

(73) Assignee: BlackBerry Limited, Waterloo, Ontario (CA)

( * ) Notice: Subject to any disclaimer, the term of this patent is extended or adjusted under 35 U.S.C. 154(b) by 105 days.

(21) Appl. No.: 13/355,196

(22) Filed: Jan. 20, 2012

(65) Prior Publication Data

US 2013/0189923 A1    Jul. 25, 2013

(51) Int. Cl.
*H04B 7/00* (2006.01)

(52) U.S. Cl.
USPC ........................................ 455/41.2; 455/41.1

(58) Field of Classification Search
USPC ............................................... 455/41.1, 41.2
See application file for complete search history.

(56) References Cited

U.S. PATENT DOCUMENTS

| | | | |
|---|---|---|---|
| 8,009,099 B2 | 8/2011 | Kalliola et al. | 342/433 |
| 8,078,225 B2 | 12/2011 | Kargl et al. | 455/558 |
| 2005/0143151 A1 | 6/2005 | Ito et al. | |
| 2008/0081631 A1* | 4/2008 | Rofougaran | 455/452.1 |
| 2008/0194298 A1* | 8/2008 | Panabaker et al. | 455/566 |
| 2010/0087146 A1 | 4/2010 | Han et al. | |
| 2012/0077593 A1* | 3/2012 | Sarmenta | 463/40 |
| 2013/0035103 A1* | 2/2013 | Mujtaba et al. | 455/450 |

FOREIGN PATENT DOCUMENTS

EP    0744841    11/1996

* cited by examiner

*Primary Examiner* — Creighton Smith
(74) *Attorney, Agent, or Firm* — Allen, Dyer, Doppelt, Milbrath & Gilchrist, P.A.

(57) ABSTRACT

A mobile wireless communications device may include a wireless transceiver, a processor coupled to the wireless transceiver, and a near-field communication (NFC) device coupled to the processor. The NFC device may include an NFC controller, an NFC transceiver coupled to the NFC controller, and spaced apart NFC antennas. The NFC device also includes a scanning switch coupled between the spaced apart NFC antennas and the NFC transceiver. The NFC controller may be configured to operate the scanning switch to successively couple each NFC antenna to the NFC transceiver, while attempting to establish NFC communication with an adjacent NFC device. The NFC device may also be configured to lock coupling to a corresponding NFC antenna upon establishing NFC communication with the adjacent NFC device.

23 Claims, 4 Drawing Sheets

MOBILE WIRELESS COMMUNICATIONS DEVICE INCLUDING NFC ANTENNA SCANNING SWITCH AND RELATED METHODS

TECHNICAL FIELD

The present disclosure generally relates to the field of wireless communications systems, and, more particularly, to mobile wireless communications devices and related methods.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. This short-range high frequency wireless communications technology exchanges data between devices over a short distance, such as only a few centimeters.

DETAILED DESCRIPTION

Figure 1:
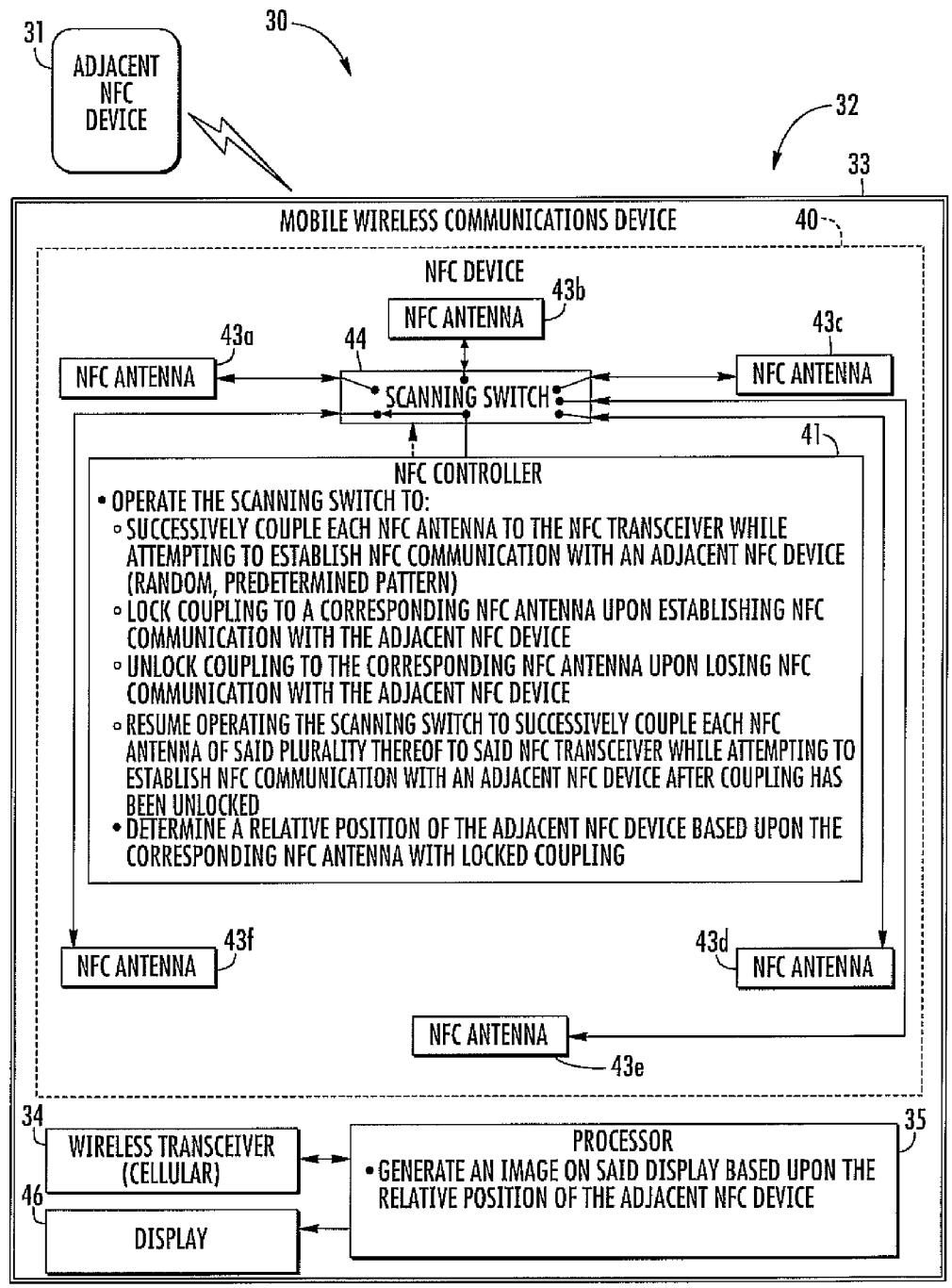
FIG. 1 is a schematic block diagram of a communications system in accordance with an example embodiment.

The present description is made with reference to the accompanying drawings, in which various embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Generally speaking, a mobile wireless communications device is disclosed herein which may include a wireless transceiver, a processor coupled to the wireless transceiver, and a near-field communication (NFC) device coupled to the processor. The NFC device may include an NFC controller, an NFC transceiver coupled to the NFC controller, and a plurality of spaced apart NFC antennas. The NFC device also includes a scanning switch coupled between the plurality of spaced apart NFC antennas and the NFC transceiver. The NFC controller may be configured to operate the scanning switch to successively couple each NFC antenna of the plurality thereof to the NFC transceiver while attempting to establish NFC communication with an adjacent NFC device. The NFC device may also be configured to lock coupling to a corresponding NFC antenna upon establishing NFC communication with the adjacent NFC device.

The NFC controller may be configured to operate the scanning switch to successively couple each NFC antenna of the plurality thereof to the NFC transceiver in a random fashion, for example. The NFC controller may be configured to operate the scanning switch to successively couple each NFC antenna of the plurality thereof to the NFC transceiver in a predetermined pattern, for example.

The NFC controller may be configured to operate the scanning switch to unlock coupling to the corresponding NFC antenna upon losing NFC communication with the adjacent NFC device. The NFC controller may be configured to resume operating the scanning switch to successively couple each NFC antenna of the plurality thereof to the NFC transceiver while attempting to establish NFC communication with an adjacent NFC device after coupling has been unlocked, for example.

The NFC controller may be configured to determine a relative position of the adjacent NFC device based upon the corresponding NFC antenna with locked coupling. The mobile wireless communications device may further include a display coupled to the processor. The processor may be configured to generate an image on the display based upon the relative position of the adjacent NFC device, for example.

The mobile wireless communications device may further include a portable housing carrying the wireless transceiver, the processor, and the NFC device, for example. The plurality of spaced apart NFC antennas may be spaced around a periphery of the portable housing. The wireless transceiver may include a cellular transceiver, for example.

A related method aspect is directed to a communications method for a mobile wireless communications device that may include a wireless transceiver, a processor coupled to the wireless transceiver, and a near-field communication (NFC) device coupled with the processor. The NFC device may include an NFC controller, an NFC transceiver coupled with the NFC controller, a plurality of spaced apart NFC antennas, and a scanning switch coupled between the plurality of spaced apart NFC antennas and the NFC transceiver. The method may include using the NFC controller to operate the scanning switch to successively couple each NFC antenna of the plurality thereof to the NFC transceiver while attempting to establish NFC communication with an adjacent NFC device. The method may further include using the NFC controller to operate the scanning switch to lock coupling to a corresponding NFC antenna upon establishing NFC communication with the adjacent NFC device.

Figure 2:
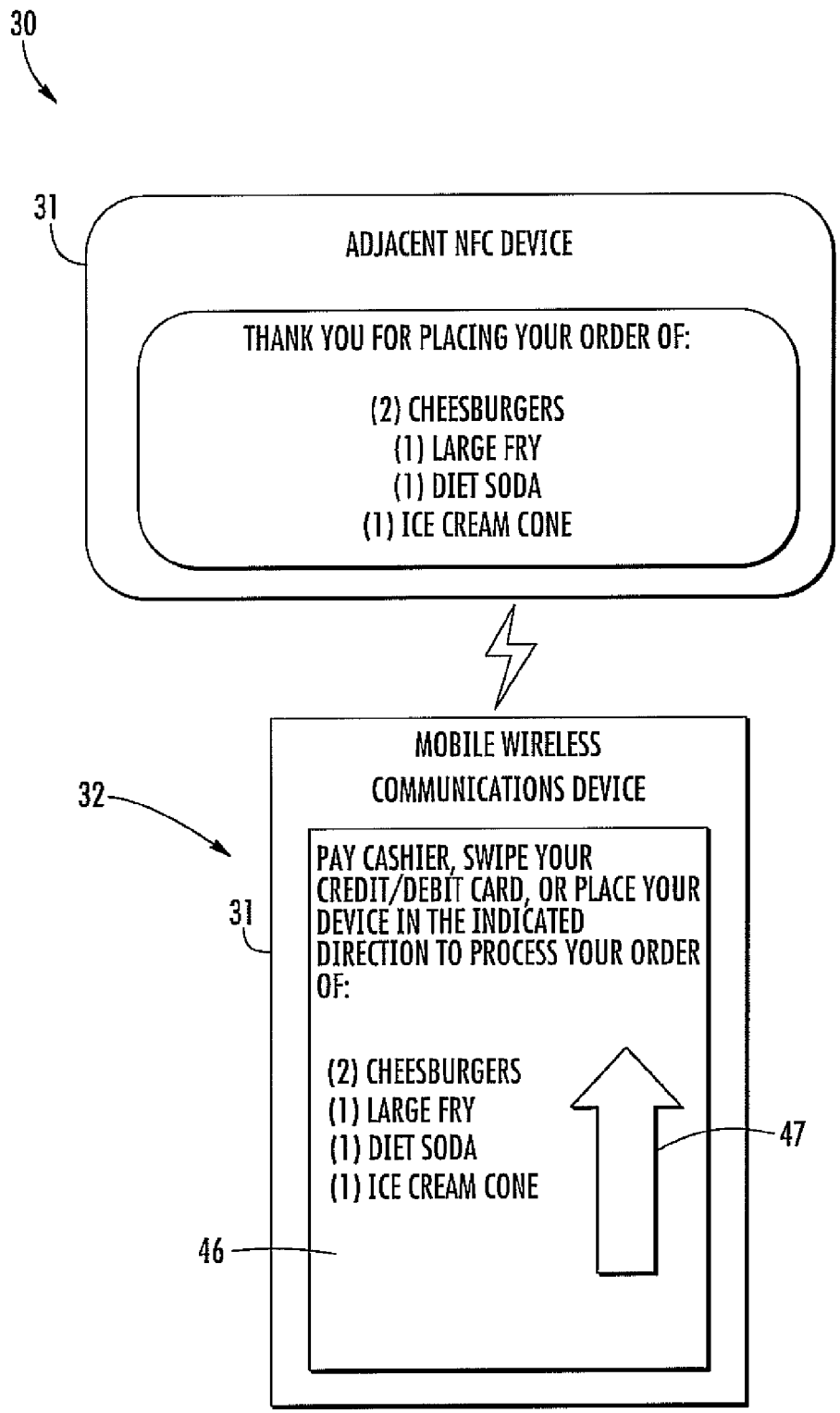
FIG. 2 is a schematic diagram of the communications system of FIG. 1 showing the display of the mobile device.

Referring initially to FIGS. 1-2, a communications system 30 illustratively includes a mobile wireless communications device 32 (also referred to as a "mobile device" herein). Example mobile wireless communications devices may include portable or personal media players (e.g., music or MP3 players, video players, etc.), portable gaming devices, portable or mobile telephones, smartphones, tablet computers, digital cameras, etc.

The mobile device 32 illustratively includes a portable housing 33 and a wireless transceiver 34 carried by the portable housing 33. The wireless transceiver 34 may comprise a cellular transceiver or other type of wireless communications transceiver, and may communicate any combination of voice and data, such as, for example, email.

The mobile device 32 includes a display 46 carried by the portable housing 33. The display 46 may comprise a liquid crystal display (LCD) and may be configured to display information relating to data or voice communications. The display 46 may be in the form of an active display that includes a backlight, for example. The display 46 may display email information, contact information, or call information. The display 46 may be another type of display, for example, a passive display, and may display other information.

The mobile device 32 also includes a processor 35 that is carried by the portable housing 33 and coupled with the wireless transceiver 34 and the display 46. The processor 35 may be implemented using hardware (e.g., memory, etc.) and software components, i.e., computer-readable instructions for causing the mobile device 32 to perform the various functions or operations described herein.

The mobile device 32 also includes a NFC device 40 carried by the portable housing 33 and coupled with the processor 35. The NFC device 40 includes a NFC controller 41 and a NFC transceiver 42 coupled with the NFC controller 41.

The NFC device 40 also includes spaced apart NFC antennas 43a-43f spaced around a periphery of the portable housing 31. Illustratively, there are six spaced apart NFC antennas 43a-43f spaced around the portable housing 33: two on each side of the portable housing, one adjacent the top of the portable housing, and one adjacent the bottom of the portable housing. Of course, there may be a different number of spaced apart NFC antennas 43 which may be spaced apart or carried by the portable housing 33 in a different configuration.

The NFC controller 41, the NFC transceiver 42, and the spaced apart NFC antennas 43a-43f advantageously cooperate to perform at least one NFC communication function. For example, the NFC device 40 may communicate with an adjacent NFC device 31 or terminal that is part of the communications system 30 based upon proximity thereto using NFC communication. The adjacent NFC device 31 may be a NFC tag, a NFC-enabled mobile device, a smart poster etc.

By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of about 10 cm, but other suitable versions of near-field communication which may have different operating frequencies, effective ranges, etc., for example, may also be used.

The NFC device 40 also includes a scanning switch 44 coupled between the NFC antennas 43a-43f and the NFC transceiver 42. The NFC controller 41 is configured to operate with the scanning switch 44 to successively couple each of the NFC antennas 43a-43f to the NFC transceiver 42 (e.g. 43a, 43b, 43c, etc.) while attempting to establish NFC communication with the adjacent NFC device 31. The NFC controller 41 is also configured to operate the scanning switch 44 to lock coupling to a corresponding NFC antenna 43a-43f upon established NFC communication with the adjacent NFC device 31. In the illustrated embodiment in FIG. 1, the scanning switch would likely be locked with NFC antenna 43a or 43b depending on the scanning pattern.

In other words, the NFC controller 41 operates the scanning switch 44 as a multiplexer to switch from one NFC antenna 43a-43f to another, attempt to communicate with the adjacent NFC device 31 using each coupled NFC antenna, and if no communication can be established with the adjacent NFC device, then switching to the next NFC antenna to attempt to establish NFC communication. The switching continues until communication is established with the adjacent NFC device 31.

The NFC controller 41 may be configured to operate the scanning switch 44 to successively couple each NFC antenna 43a-43f to the NFC transceiver 42 in a random manner. The NFC controller 41 may be configured to operate the scanning switch 44 to successively couple each NFC antenna 43a-43f to the NFC transceiver 42 in a predetermined pattern. For example, the NFC controller 41 may be configured to operate the scanning switch 44 to successively couple each NFC antenna 43a-43f to the NFC transceiver 42 in a zig-zag pattern (e.g. 43a, 43d, 43f, 43c, 43e, 43b), by location in the portable housing 33 (e.g. 43a, 43f, 43c, 43d, 43b, 43e).

In some embodiments, after communication has been established with the adjacent NFC device 31, the NFC controller 41 may operate the scanning switch to successively couple each of the NFC antennas 43a-43f that are not-locked to the NFC transceiver 42 while attempting to establish NFC communication with another adjacent NFC device. In other words, more than one NFC antenna 43a-43f may be locked upon establishing communication with respective adjacent NFC devices.

The NFC controller 41 is also configured to operate the scanning switch 44 to unlock coupling to the corresponding NFC antenna 43a-43f upon losing NFC communication with the adjacent NFC device 31. This may occur, for example, if adjacent NFC device 31 is outside the effective range of the NFC transceiver 42. The NFC controller 41 is also configured to resume operating the scanning switch 44 to successively couple each NFC antenna 43a-43f to the NFC transceiver 42 while again attempting to establish NFC communication with the adjacent NFC device after coupling has been unlocked.

As will be appreciated by those skilled in the art, when using NFC with multiple devices, a single NFC antenna may be a "blocker" to achieve desired performance in cases of common use. For example, an NFC device near a center of a mobile wireless communications device may make it increasingly difficult to interact with adjacent NFC device when the mobile wireless communications device is placed on a table. Coupling multiple NFC antennas, for example, in series, to an NFC transceiver results in increased attenuation, and thus, undesired operation. Including multiple NFC antennas with respective NFC transceivers may address the above-noted problem; however, multiple NFC transceivers increase production costs, draw an increased amount of power, and occupy an increased amount of space in the portable housing. Advantageously, the NFC controller 41 being configured to operate the scanning switch 44, as described herein, has a reduced impact on efficiency with respect to other approaches, as it may consume roughly the same amount of power as compared to a single NFC antenna. Sensitivity of each NFC antenna 43a-43f may also be maintained.

The NFC controller 41 may be configured to determine a relative position of the adjacent NFC device 31 based upon the corresponding NFC antenna 43a-43f with locked coupling. In particular, the processor 35 may be configured to generate an image 47, (e.g. an arrow) on the display 46 based upon the relative position of the adjacent NFC device 31 (FIG. 2). This may be particularly advantageous for use with a directionally based application, for example, where a user interface is updated based upon the relative location of the adjacent NFC device 31. Additionally, determining the relative location of the adjacent NFC device 31 may also be particularly advantageous for spanning a user interface across multiple displays, for example.

As will be appreciated by those skilled in the art, one exemplary application of the embodiments described herein may be in a fast food setting with a fast food ordering application. A user may order items on tablet, for example, and pay with an NFC equipped smart phone through a front NFC antenna. The rear NFC antenna may be used for relaying information or functions for the fast food restaurant employees, for example, locking, unlocking, and/or cancelling an order.

Figure 3:
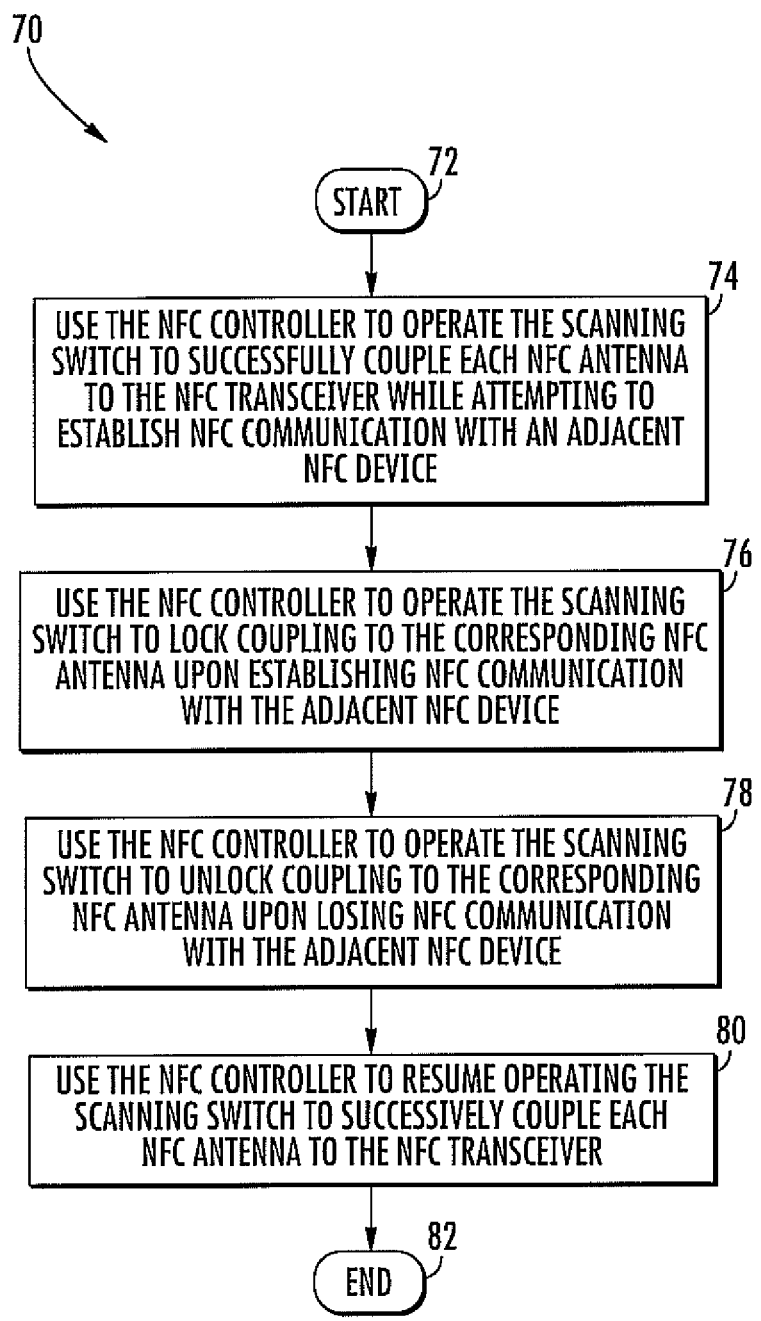
FIG. 3 is a flow diagram illustrating example method aspects associated with the system and devices of FIGS. 1-2.

Referring now to the flowchart 70 in FIG. 3, beginning at Block 72, a related method aspect is directed to a communications method for a mobile wireless communications device 30 that may include a wireless transceiver 34, a processor 35 coupled to the wireless transceiver, and a near-field communication (NFC) device 40 coupled with the processor. The NFC device 40 may include an NFC controller 41, an NFC transceiver 42 coupled with the NFC controller, a plurality of spaced apart NFC antennas 43a-43f, and a scanning switch 44 coupled between the plurality of spaced apart NFC antennas and the NFC transceiver. At Block 74, the method includes using the NFC controller 41 to operate the scanning switch 44 to successively couple each NFC antenna 43a-43f to the NFC transceiver 44 while attempting to establish NFC communication with an adjacent NFC device 31. The method further includes, at Block 76 using the NFC controller 41 to operate the scanning switch 44 to lock coupling to a corresponding NFC antenna 43a-43f upon establishing NFC communication with the adjacent NFC device 31.

At Block 78, the further includes using the NFC controller 41 to operate the scanning switch 44 to unlock coupling to the corresponding NFC antenna 43a-43f upon losing NFC communication with the adjacent NFC device 31. The method further includes, at Block 80, using the NFC controller 41 to resume operating the scanning switch to successively couple each NFC antenna 43a-43f to the NFC transceiver 41 while attempting to establish NFC communication with an adjacent NFC device 31 after coupling has been unlocked. The method ends at Block 82.

Example components of a mobile wireless communications device 1000 that may be used in accordance with the above-described embodiments are further described below with reference to FIG. 4. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 4:
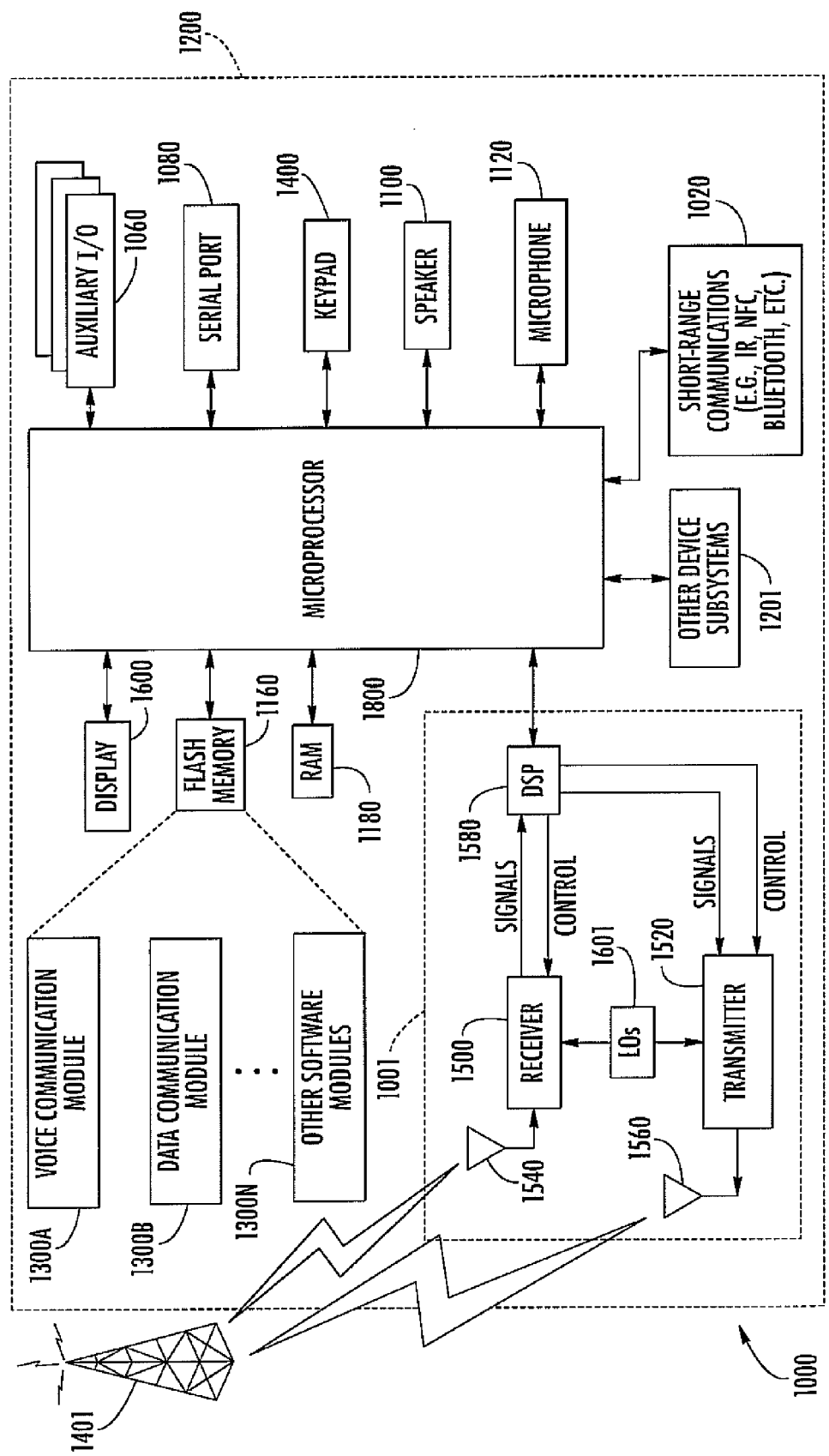
FIG. 4 is a schematic block diagram illustrating example mobile wireless communications device components that may be used with the devices of FIGS. 1 and 2.

In addition to the processing device 1800, other parts of the mobile device 1000 are shown schematically in FIG. 4. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, COMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) sensor for communicating with a NFC device or NFC tag via NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A mobile wireless communications device comprising:
a wireless transceiver;
a processor coupled to said wireless transceiver; and
a near-field communication (NFC) device coupled to said processor and comprising
an NFC controller,
an NFC transceiver coupled to said NFC controller,
a plurality of spaced apart NFC antennas, and
a scanning switch coupled between said plurality of spaced apart NFC antennas and said NFC transceiver,
said NFC controller configured to operate said scanning switch to
successively couple each NFC antenna of said plurality thereof to said NFC transceiver while attempting to establish NFC communication with an adjacent NFC device,
lock coupling to a corresponding NFC antenna upon establishing NFC communication with the adjacent NFC device, and
unlock coupling to the corresponding NFC antenna upon losing NFC communication with the adjacent NFC device.

2. The mobile wireless communications device of claim 1, wherein said NFC controller is configured to operate the scanning switch to successively couple each NFC antenna of said plurality thereof to said NFC transceiver in a random fashion.

3. The mobile wireless communications device of claim 1, wherein said NFC controller is configured to operate the scanning switch to successively couple each NFC antenna of said plurality thereof to said NFC transceiver in a predetermined pattern.

4. The mobile wireless communications device of claim 1, wherein said NFC controller is configured to resume operating the scanning switch to successively couple each NFC antenna of said plurality thereof to said NFC transceiver while attempting to establish NFC communication with an adjacent NFC device after coupling has been unlocked.

5. The mobile wireless communications device of claim 1, wherein said NFC controller is configured to determine a relative position of the adjacent NFC device based upon the corresponding NFC antenna with locked coupling.

6. The mobile wireless communications device of claim 5, further comprising a display coupled to said processor; and wherein said processor is configured to generate an image on said display based upon the relative position of the adjacent NFC device.

7. The mobile wireless communications device of claim 1, wherein said wireless transceiver comprises a cellular transceiver.

8. A near-field communication (NFC) device to be coupled to a processor of a mobile wireless communications device comprising a wireless transceiver coupled to the processor, the NFC device comprising:
an NFC controller;
an NFC transceiver coupled to said NFC controller;
a plurality of spaced apart NFC antennas; and
a scanning switch coupled between said plurality of spaced apart NFC antennas and said NFC transceiver;
said NFC controller configured to operate said scanning switch to
successively couple each NFC antenna of said plurality thereof to said NFC transceiver while attempting to establish NFC communication with an adjacent NFC device,
lock coupling to a corresponding NFC antenna upon establishing NFC communication with the adjacent NFC device, and
unlock coupling to the corresponding NFC antenna upon losing NFC communication with the adjacent NFC device.

9. The NFC device of claim 8, wherein said NFC controller is configured to operate the scanning switch to successively couple each NFC antenna of said plurality thereof to said NFC transceiver in a random fashion.

10. The NFC device of claim 8, wherein said NFC controller is configured to operate the scanning switch to successively couple each NFC antenna of said plurality thereof to said NFC transceiver in a predetermined pattern.

11. The NFC device of claim 10, wherein said NFC controller is configured to resume operating the scanning switch to successively couple each NFC antenna of said plurality thereof to said NFC transceiver while attempting to establish NFC communication with an adjacent NFC device after coupling has been unlocked.

12. The NFC device of claim 8, wherein said NFC controller is configured to determine a relative position of the adjacent NFC device based upon the corresponding NFC antenna with locked coupling.

13. A communications method for a mobile wireless communications device comprising a wireless transceiver, a processor coupled to the wireless transceiver, and a near-field communication (NFC) device coupled with the processor and comprising an NFC controller, an NFC transceiver coupled with the NFC controller, a plurality of spaced apart NFC antennas, and a scanning switch coupled between the plurality of spaced apart NFC antennas and the NEC transceiver, the method comprising:
  using the NFC controller to operate the scanning switch to successively couple each NFC antenna of the plurality thereof to the NFC transceiver while attempting to establish NFC communication with an adjacent NFC device;
  using the NFC controller to operate the scanning switch to lock coupling to a corresponding NFC antenna upon establishing NFC communication with the adjacent NFC device; and
  using the NFC controller to operate the scanning switch to unlock coupling to the corresponding NFC antenna upon losing NFC communication with the adjacent NFC device.

14. The method of claim 13, further comprising using the NFC controller to operate the scanning switch to successively couple each NFC antenna of the plurality thereof to the NFC transceiver in a random fashion.

15. The method of claim 13, further comprising using the NFC controller to operate the scanning switch to successively couple each NFC antenna of the plurality thereof to the NFC transceiver in a predetermined pattern.

16. The method of claim 15, further comprising using the NFC controller to resume operating the scanning switch to successively couple each NFC antenna of the plurality thereof to the NFC transceiver while attempting to establish NFC communication with an adjacent NFC device after coupling has been unlocked.

17. The method of claim 13, further comprising using the NFC controller to determine a relative position of the adjacent NFC device based upon the corresponding NFC antenna with locked coupling.

18. A mobile wireless communications device comprising:
  a portable housing;
  a wireless transceiver carried by said portable housing;
  a processor carried by said portable housing and coupled to said wireless transceiver; and
  a near-field communication (NFC) device carried by said portable housing and coupled to said processor and comprising
    an NFC controller,
    an NFC transceiver coupled to said NFC controller,
    a plurality of NFC antennas spaced around a periphery of said portable housing, and
    a scanning switch coupled between said plurality of spaced apart NFC antennas and said NFC transceiver,
    said NFC controller configured to operate said scanning switch to
      successively couple each NFC antenna of said plurality thereof to said NFC transceiver while attempting to establish NFC communication with an adjacent NFC device, and
      lock coupling to a corresponding NFC antenna upon establishing NFC communication with the adjacent NFC device.

19. The mobile wireless communications device of claim 18, wherein said NFC controller is configured to operate the scanning switch to successively couple each NFC antenna of said plurality thereof to said NFC transceiver in a random fashion.

20. The mobile wireless communications device of claim 18, wherein said NFC controller is configured to operate the scanning switch to successively couple each NFC antenna of said plurality thereof to said NFC transceiver in a predetermined pattern.

21. The mobile wireless communications device of claim 18, wherein said NFC controller is configured to determine a relative position of the adjacent NFC device based upon the corresponding NFC antenna with locked coupling.

22. The mobile wireless communications device of claim 21, further comprising a display coupled to said processor; and wherein said processor is configured to generate an image on said display based upon the relative position of the adjacent NFC device.

23. The mobile wireless communications device of claim 18, wherein said wireless transceiver comprises a cellular transceiver.

* * * * *

UNITED STATES PATENT AND TRADEMARK OFFICE
CERTIFICATE OF CORRECTION

| | | |
|---|---|---|
| PATENT NO. | : 8,688,043 B2 | Page 1 of 1 |
| APPLICATION NO. | : 13/355196 | |
| DATED | : April 1, 2014 | |
| INVENTOR(S) | : Lewin | |

It is certified that error appears in the above-identified patent and that said Letters Patent is hereby corrected as shown below:

In the Claims:

Column 9, Line 15   Delete: "NEC"
                    Insert: --NFC--

Signed and Sealed this
Twelfth Day of August, 2014

Michelle K. Lee
*Deputy Director of the United States Patent and Trademark Office*